(12) United States Patent
Benedict et al.

(10) Patent No.: US 10,416,647 B1
(45) Date of Patent: Sep. 17, 2019

(54) APPARATUS FOR DETERMINING AXES FOR THE COMPUTER ASSISTED SETUP OF A MACHINE TOOL TABLE

(71) Applicant: Beneficial Machine Tools LLC, Fremont, CA (US)

(72) Inventors: George Benedict, Fremont, CA (US); Oscar Lim, Fremont, CA (US)

(73) Assignee: BENEFICIAL MACHINE TOOLS LLC, Fremont, CA (US)

(*) Notice: Subject to any disclaimer, the term of this patent is extended or adjusted under 35 U.S.C. 154(b) by 210 days.

(21) Appl. No.: 15/693,298

(22) Filed: Aug. 31, 2017

Related U.S. Application Data (63) Continuation-in-part of application No. 15/140,422, filed on Apr. 27, 2016, now Pat. No. 9,903,699.

(51) Int. Cl.
| | |
|---|---|
| *G01B 5/12* | (2006.01) |
| *G05B 19/29* | (2006.01) |
| *G01B 5/012* | (2006.01) |
| *B23Q 17/00* | (2006.01) |

(52) U.S. Cl.
CPC ........... *G05B 19/29* (2013.01); *B23Q 17/003* (2013.01); *G01B 5/012* (2013.01); *B23Q 2717/006* (2013.01); *G05B 2219/34015* (2013.01); *G05B 2219/45145* (2013.01)

(58) Field of Classification Search
CPC ....... G05B 19/29; B23Q 17/003; G01B 5/012
USPC .................................................... 33/502, 503
See application file for complete search history.

(56) References Cited

U.S. PATENT DOCUMENTS

| | | | |
|---|---|---|---|
| 5,193,286 | A | 3/1993 | Collier |
| 5,285,397 | A | 2/1994 | Heier et al. |
| 5,895,444 | A | 4/1999 | Ruck et al. |
| 6,019,554 | A | 2/2000 | Hong |
| 7,712,224 | B2 | 5/2010 | Hicks |
| 9,235,206 | B2 | 1/2016 | Benedict et al. |
| 9,880,542 | B1* | 1/2018 | Brown ............... G05B 19/0426 |
| 9,903,699 | B2 | 2/2018 | Benedict et al. |
| 2001/0008047 | A1 | 7/2001 | Okada et al. |
| 2007/0220767 | A1 | 9/2007 | Pettersson |

(Continued)

OTHER PUBLICATIONS

International Search Report and Written Opinion issued to international patent application No. PCT/US17/29717, dated Aug. 7, 2017, 7 pgs.

*Primary Examiner* — George B Bennett
(74) *Attorney, Agent, or Firm* — Cooley LLP (57) ABSTRACT

A non-transitory computer readable storage medium has instructions executed by a processor to compute an x-axis axial position based upon a first host border measurement signal, a second host border measurement signal, first x-axis axial measurement signals and second x-axis axial measurement signals. A y-axis axial position is computed based upon the first host border measurement signal, the second host border measurement signal, first y-axis axial measurement signals and second y-axis axial measurement signals. A z-axis axial position is computed based upon the first host border measurement signal, the second host border measurement signal, first z-axis axial measurement signals and second z-axis axial measurement signals. The operation of a computer numerical control milling machine is coordinated based upon the x-axis axial position, the y-axis axial position and the z-axis axial position.

6 Claims, 11 Drawing Sheets

(56) References Cited

U.S. PATENT DOCUMENTS

| | | |
|---|---|---|
| 2010/0139107 A1 | 6/2010 | Koinuma et al. |
| 2011/0054835 A1 | 3/2011 | Takamasu et al. |
| 2014/0007441 A1 | 1/2014 | Pettersson et al. |
| 2014/0157610 A1 | 6/2014 | Garvey et al. |
| 2015/0000148 A1 | 1/2015 | Abe |
| 2015/0091489 A1 | 4/2015 | Benedict et al. |
| 2016/0041068 A1 | 2/2016 | Wascat et al. |
| 2016/0054722 A1 | 2/2016 | Jalluri et al. |
| 2016/0216098 A1 | 7/2016 | Hediger |
| 2017/0227343 A1 | 8/2017 | Singh et al. |
| 2017/0241759 A1 | 8/2017 | Werner et al. |
| 2018/0079043 A1* | 3/2018 | Inoue ................. B23Q 15/00 |
| 2019/0111534 A1* | 4/2019 | Ishii ..................... G01B 5/012 |

\* cited by examiner

APPARATUS FOR DETERMINING AXES FOR THE COMPUTER ASSISTED SETUP OF A MACHINE TOOL TABLE

CROSS-REFERENCE TO RELATED APPLICATION

This application is a continuation-in-part of U.S. Ser. No. 15/140,422, filed Apr. 27, 2016, the contents of which are incorporated herein by reference.

TECHNICAL FIELD

The present invention relates generally to machine tool tables. More particularly, the invention relates to an apparatus for determining axes for the computer assisted setup of a machine tool table.

BACKGROUND

The parent patent application referenced above describes an automatic apparatus to provide refined positions which improve the accuracy of the digital readouts of a remote CNC (computer numeric controlled) machine tool table. In order to obtain the best accuracy, the exact directions of the X, Y, and Z axes associated with these digital readouts must be determined. An embodiment of an apparatus and method for generating and measuring machine tool table directions relative to a set of mutually orthogonal axes, and hence a first refinement to automatically improve the accuracy of X, Y, and Z digital readout positions of the remote CNC machine tool table, is disclosed herein.

After the set of mutually orthogonal axes are determined the best accuracy for the refined positions, automatically corrected for environmental factors as described in the parent patent application, is thereby defined as the second refinement. Also described in the parent patent application is a remote numeric control of the table motions and display of X, Y and Z raw and refined positions.

An axis is characterized as a direction in space with uniform increments located along that direction. The relevant axis directions for the vise, the spindle, and the table are described next.

Figure 1A:
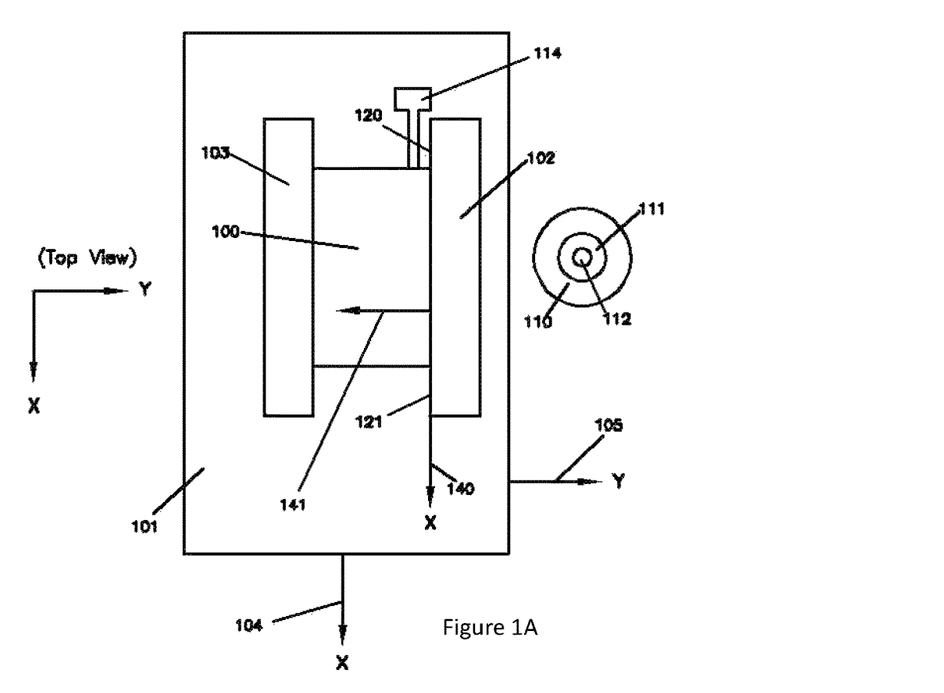
FIG. 1A shows a top view of a remote computer numeric controlled milling machine table.

Shown in the top view of FIG. 1A is the machine tool table 101 with vise fixed jaw 102 and vise clamping jaw 103 holding a part 100. The fixed vise jaw 102 has a reference surface with points 120 and 121 to define the vise X axis direction 140. The fixed vise jaw 102 reference surface also determines the vise Y axis direction 141. The table 101 has motion X axis direction 104, and motion Y axis direction 105. The machine tool table 101 may move in an X axis direction 104 different from the vise reference surface X axis direction 140. Also shown in FIG. 1A are tool holder 111, spindle 110, and measuring probe 112 as discussed below.

Figure 1B:
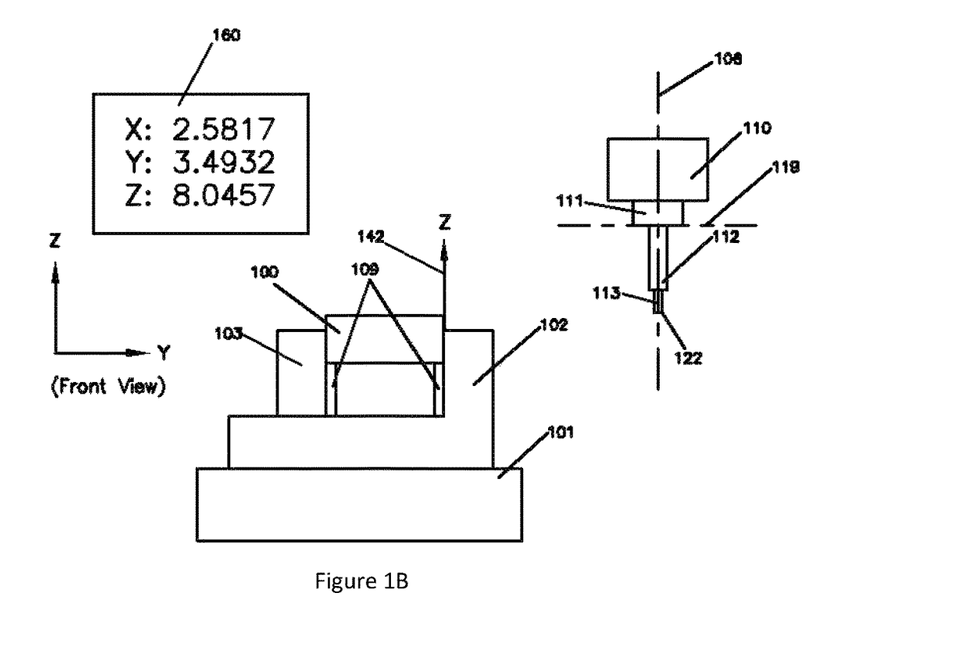
FIG. 1B shows a front view of a remote computer numeric controlled milling machine table.

FIG. 1B is a front view of the table direction (but not actual table motion) Z axis direction 106 as defined by the spindle 110 which moves relative to the table 101. The vise fixed jaw 102 has a reference surface that also defines the vise Z axis direction 142 as shown. The vise Z axis is suitable for determining the table Z axis direction 142, and is defined by the vise as shown in the FIG. 1B front view when the vise is clamped to the table 101, as is standard machine shop practice.

Also shown in the FIG. 1B is the Z axis 106 for spindle 110 holding a tool holder 111 and measuring probe 112. The spindle 110, tool holder 111 and measuring probe 112 are rotated about and translated in the Z axis direction 106. The spindle Z axis direction 106 may be different from the table Z axis direction 142.

Typically raw X, Y, and Z positions of reference surfaces may be measured by a probe 112 and displayed by X, Y, and Z digital readouts 160 shown in FIG. 1B, and also described in the parent patent application. These probes typically measure relative position, such as between two reference surfaces on or related to the table 101, and may not determine the X or Y spindle location of Z axis direction 106. As described in the parent patent application, electronic gauge blocks located on the table 101 (not shown in FIG. 1A) utilizing a probe held in a shrink fit tool holder 111, are useful to automatically determine the X, Y and Z spindle location of Z axis direction 106 relative to a reference surface on each of the X, Y and Z electronic gauge blocks mounted on table 101. The Z axis reference surface 119 for the location of positions in Z axis direction 106 is shown on the tool holder 111.

An example of the measuring probe 112 is made by the company Swiss Precision Instruments (SPI) and is sold as part number 98-316-3. The manually operated SPI measuring probe 112 has a light that turns on when the cylinder measuring tip touches an X or Y or Z edge. A benefit of the SPI measuring probe 112 is that when the measurement is taking place, zero force is applied to the surface; hence it does not disturb the measurement of delicate parts. The measuring probe 112 may have a cylindrical tip 113 with a well-known diameter or geometrical offset 122 from the spindle Z axis direction 520, as well as a well-known geometrical offset 122 from the Z axis reference surface 119.

Tool holder 111 allows the CNC mill to automatically change the measuring probe 112, for example back and forth to another tool holder identical to 111 that may hold, for example, the heat shrink mounted probe not shown here but described in the parent patent application.

An orthogonal coordinate system comprises X, Y, and Z axes, and is useful to describe the working space where a part 100 is fabricated above the machine tool table 101. Presently the non-orthogonal coordinate system, and associated X, Y and Z axis digital readouts 160, for typical machine tool tables is accurate to within ±0.002 inches. Such X, Y and Z axis digital readouts 160 are often not trusted by the machinist. The practice of final inspection after fabrication of the part 100 is trusted to better than ±0.00005 inch (±50 pinch) using instrumentation and an orthogonal coordinate system separate from the CNC mill.

Special inspection tolerance of ±1 pinch for a gauge block is possible which we refer to as a high precision grade. Gauge blocks are not shown herein, but are described in the parent patent.

It is desirable to have accuracy of ±0.0002 inches for an orthogonal machine tool table coordinate system, and associated X, Y and Z axis digital readouts 160, which determine the mutually orthogonal X and Y axis positions of machine tool table 101, and Z axis position of tool holder 111.

The table 101 typically has jack screws on the floor (not shown) to level the table 101 by tilting the Z axis direction 142 of table 101, also resulting in tilting of the attached gantry structure (not shown) holding spindle 110 to the supporting structure for table 101. Such tilting by the jack screws, or inadvertently by the floor moving, may disturb the alignment between the Z axis direction 106 of the spindle 110 relative to the table Z axis direction 142 because the gantry structure is not perfectly rigid.

It is desirable for the motion of the spindle 110 holding and rotating the tool 112 in the Z axis direction 142 to be determined as aligned nearly parallel in the same direction relative to the table Z axis direction 106 so as to achieve high accuracy.

From the machinist's perspective, the definition of the X, Y, and Z axes is first described by an engineering drawing for the part 100. The engineering drawing provides information as to the linear and angular tolerances required for features fabricated into part 100. The X, Y, and Z axes are assumed to be straight lines mutually orthogonal to each other. Angle error tolerances of the features of fabricated part 100 are customarily specified as runout errors. Runout errors are defined by a baseline along a direction associated with an X, Y, or Z axis and the small departures along both of the other two axis directions. For example, if the baseline is along the Y axis direction the departures may be both along the X axis direction and the Z axis direction. The physical units for specifying small runout are inches in the departure direction divided by inches in the baseline direction, where it is desirable to have a long baseline to measure better runout accuracy. The runout is essentially an angle measured in radians, but it is not the custom of machinists to work in angular units.

The fabrication of the part 100 may involve manipulating the part in the vise on the machine tool table in the X, Y, and Z axis directions so as to find suitable orientations to optimize the fabrication process. A vise with jaws 102 and 103 is used to hold the part 100 shown in FIG. 1A and FIG. 1B. The problem then becomes setting up the fixed vise jaw 102, rather than the part 100, to align with mutually orthogonal X, Y, and Z axes described above. Once the vise is properly positioned, the proper alignment to hold the part 100 with suitable manipulations in the vise, consistent with the mutually orthogonal X, Y, and Z axes described in the engineering drawing is thereby established.

Standard practice setup of the vise typically has a first step to align the vise fixed jaw 102 in the X axis direction defined by table motion X axis direction 104. Alignment of the vise X axis reference surface on fixed jaw 102 can be determined using a measuring probe 112 held by a tool holder 111 in the spindle 110, as shown in FIG. 1B. Runout in the vise X axis direction 140 baseline with departure in Y axis direction 141 at for example the vise points 120 and 121 shown in FIG. 1A, is determined using the measuring probe 112.

Presently the machinist typically uses a mallet to tap the vise producing small corrections to minimize the departure Y axis direction 141 runout. The process of measuring and tapping is repeated to optimize (by minimizing the departure Y axis direction 141 runout) the vise X axis 140 alignment relative to the table motion X axis direction 104. Presently there is no way to tap or otherwise adjust the departure in Z axis direction 142 of vise X axis 140 direction to align with the table X axis direction 104.

It is difficult to precisely align the vise X axis direction 140 by tapping; therefore it is desirable to provide a computer assisted runout correction to the alignment in the event there is a departure error in the Y axis table motion direction 105 causing a runout error between the vise X axis direction 140 and the table motion X axis direction 104.

It is not possible to precisely align the vise X axis direction 140 in the event there is a departure error in the Z axis spindle motion direction 106 causing a runout error in X axis direction 140, therefore it is desirable to provide a computer assisted runout correction to the alignment in the event there is a small Z axis direction 106 departure error between the vise X axis direction 140 and the table motion X axis direction 104.

It is desirable to provide computer assisted runout corrections to the alignment in the event there are small departure errors between the vise Y axis direction 141 and the table Y axis direction 105. Also the table motions in the X, Y, and Z axes are intended to be mutually orthogonal to each other and the vise X, Y, and Z axes are intended to be mutually orthogonal to each other, hence it is also desirable to correct for orthogonal axis errors using runout corrections. Table motions in the X, Y, and Z axes are intended to be mutually orthogonal to each other, and this condition may be determined by a ball-bar test. However, the ball-bar test does not provide information about the vise X, Y, and Z axes.

SUMMARY OF THE INVENTION

A non-transitory computer readable storage medium has instructions executed by a processor to compute an x-axis axial position based upon a first host border measurement signal, a second host border measurement signal, first x-axis axial measurement signals and second x-axis axial measurement signals. A y-axis axial position is computed based upon the first host border measurement signal, the second host border measurement signal, first y-axis axial measurement signals and second y-axis axial measurement signals. A z-axis axial position is computed based upon the first host border measurement signal, the second host border measurement signal, first z-axis axial measurement signals and second z-axis axial measurement signals. The operation of a computer numerical control milling machine is coordinated based upon the x-axis axial position, the y-axis axial position and the z-axis axial position.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 2:
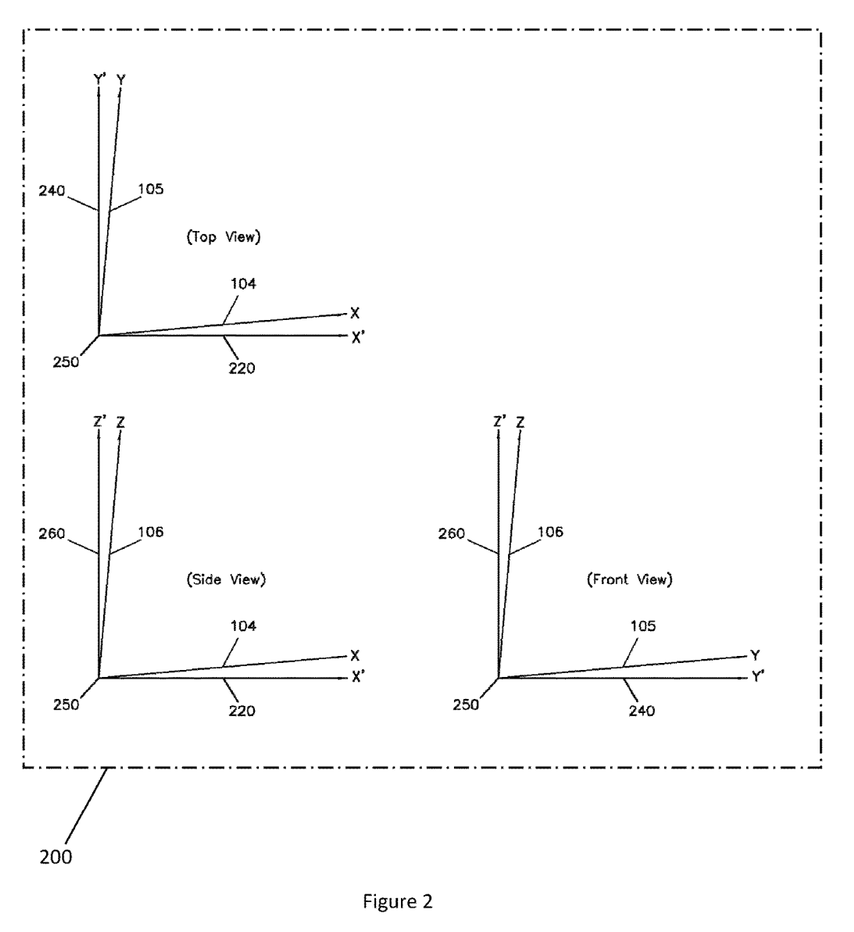
FIG. 2 shows an orthographic view of projected top, side and front views of the raw and refined axes.

FIG. 2 shows an orthographic projection 200 of the top, side and front views of the raw and refined axes as typically represented in the engineering drawing for a part 100 shown in FIG. 1. The raw table motions are described by X axis direction 104 motion and Y axis 105 direction motion, and the Z axis direction 106 of the table 101 as previously described in connection with the discussion of FIG. 1. The refined X' axis direction 220, refined Y' axis direction 240, and refined Z' axis direction 260, are mutually orthogonal and have an origin point 250 that may coincide with the table X, Y, and Z axis origin point. Orthogonal axis representations may be drawn without distortion on a flat surface such as the page of FIG. 2 and are typically the representations preferred by the design engineer preparing the engineering drawings for part 100. Orthogonal views of the projections are represented without distortion in FIG. 2, while the actual directions of the X, Y, and Z axes directions for the machine tool table 101 are distorted and may not be in the flat planes of the page shown in FIG. 2.

As can be inferred from FIG. 2, there are six measurable runout conditions. The X axis direction 104 can have runout departures, shown in the top and side views, in the Y' axis direction 240 and the Z' axis direction 260.

Figure 7:
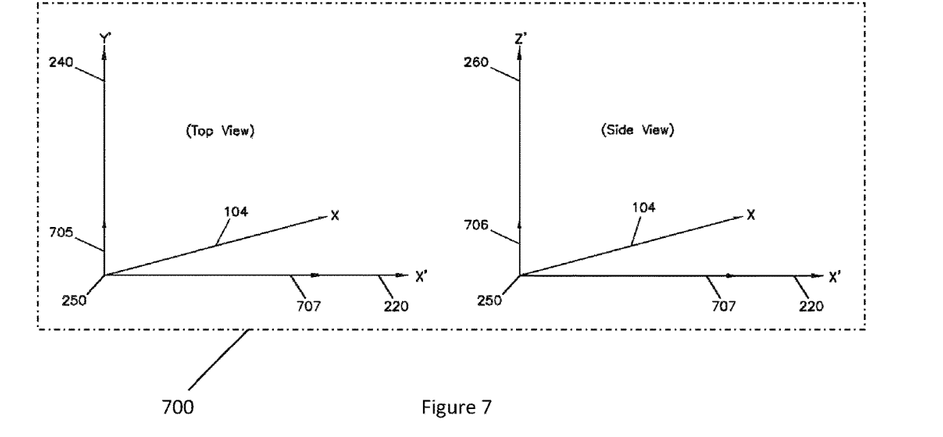
FIG. 7 shows an orthographic view of the raw X axis with projected top and side views of the refined X axis and runout departures.

These measurable departures for the X axis 104 are called δXinY 705 and δXinZ 706 where both departures are shown in FIG. 7. Similarly the Y axis direction can have runout departures called δYinX and δYinZ (not shown). And the Z axis direction can have runout departures δZinX and δZinY (not shown). Also shown in FIG. 7 is the projection Xp 707 of the raw X axis 104 onto the refined X' axis 220.

The six normalized runout coefficients, having units of inches of departure per inch of baseline, are given by:

deltaXinY=ArcTan(δXinY/B) and deltaXinZ=ArcTan(δXinZ/B), deltaYinX=ArcTan(δYinX/B) and deltaYinZ=ArcTan(δYinZ/B), and deltaZinX=ArcTan(δZinX/B) and deltaZinY=ArcTan(δZinY/B).

Where the runout baseline B point 380 described below in connection with the discussion related to the FIG. 3C orthographic projection 300 used to make the measurement, is typically made large for higher accuracy, and so the ratio of the measurements δXinY/B is small.

A vector description of the X, Y, and Z axes in terms of the orthogonal X', Y', and Z' directions using the six runout corrections, where the two X axis runouts, δXinY 705 and δXinZ 706 are shown in the orthographic 700 views of FIG. 7, and the projection Xp 707, of the X axis 104 onto the X' axis direction 220, are given by:

X'=(Xp,δXinY,δXinZ),

Y'=(δYinX,Yp,δYinZ), and

Z'=(δZinX,δZinY,Zp).

Any point P(X', Y', Z') can be represented in the orthogonal axis directions as the vector sum of each of the components, so:

P(X',Y',Z')=(Xp+δYinX+δZinX,Yp+δXinY+δZinY,Zp+δXinZ+δYinZ).

Where P(X', Y', Z')=P(X, Y, Z) the point on the table 101 called out by the digital readouts. We now calculate the projection of X onto X' using the magnitude of the vector X:

$$X=|X|=\sqrt{Xp^2+(\delta XinY)^2+(\delta XinZ)^2}$$

$$X^2=xp^2+(\delta XinY)^2+(\delta XinY)^2,$$

$$Xp=\sqrt{X^2-(\delta XinY)^2+(\delta XinZ)^2},$$

and $Xp=X\sqrt{1-(\delta XinY/X)^2-(\delta XinZ/X)^2}$.

Similarly for Yp and Zp:

$$Yp=Y\sqrt{1-(\delta YinX/Y)^2-(\delta YinZ/Y)^2},$$

and $Zp=Z\sqrt{1-(\delta ZinX/Z)^2-(\delta ZinY/Z)^2}$.

This gives the following equations for the description of point P(X', Y', Z') described by orthogonal refined axes in terms of the six normalized runout coefficients and raw X, Y, and Z digital readout values:

| | |
|---|---|
| X'=Xp+deltaXinY*Y+deltaXinZ*Z | Equation (1) |
| Y'=Yp+deltaYinX*X+deltaYinZ*Z | Equation (2) |
| Z'=Zp+deltaZinX*X+deltaZinY*Y | Equation (3) |

Figure 3A:
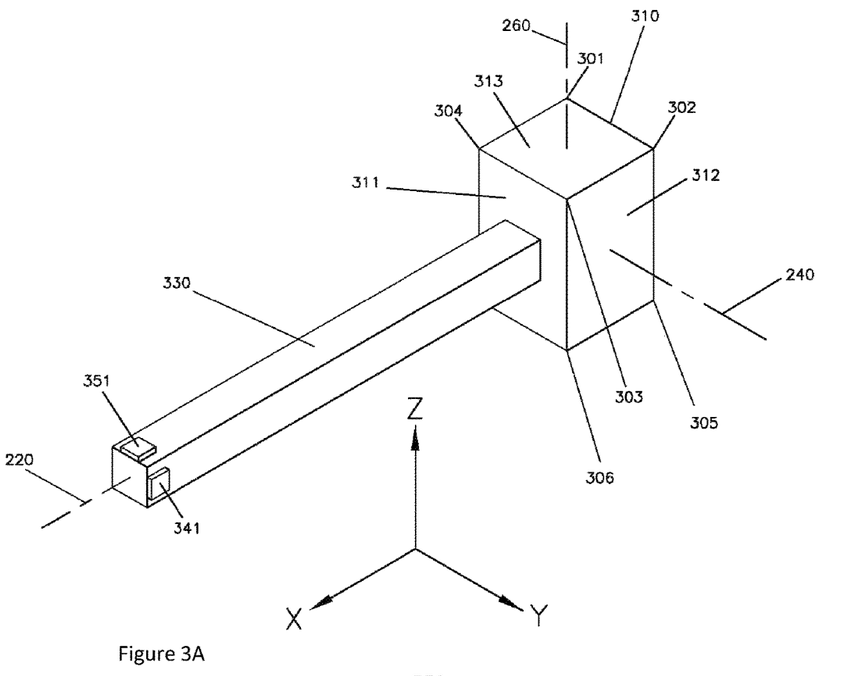
FIG. 3A shows an isometric view of a three dimensional refined axis direction gauge.

A three dimensional refined axis direction gauge apparatus is shown in the FIG. 3A isometric view. The three dimensional axis direction gauge comprises a host 310 with face 311, face 312, and face 313, and an axis extension bar 330.

The host 310 hosts a primary axis 220 projecting out of face 311, a secondary axis 240 projecting out of face 312, and a tertiary axis 260 projecting out of face 313.

The axis extension bar 330 has reference surfaces 341 and 351. In the preferred embodiment of the invention the host 310 and the axis extension bar 330 are made from a single piece.

Figure 3B:
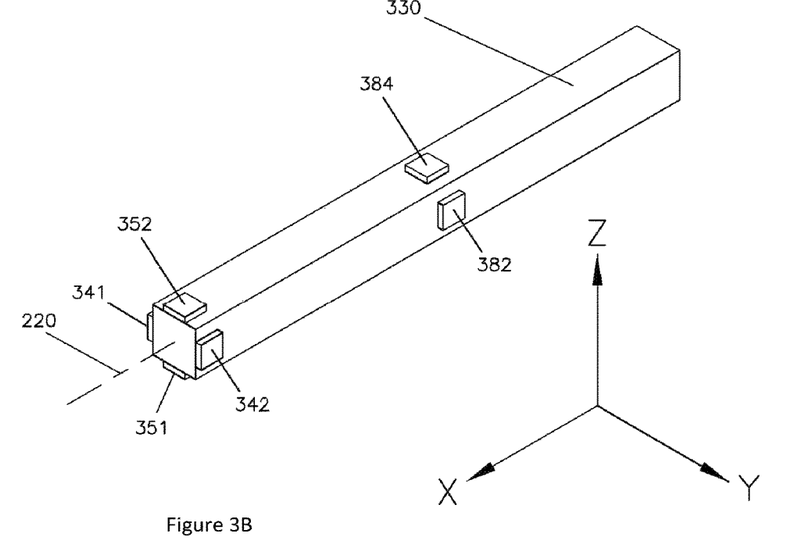
FIG. 3B shows an isometric view of an alternate embodiment of an axis extension bar.

In an alternative embodiment shown in FIG. 3B there are four additional reference surfaces on the extension bar 330. Reference surface 342 facilitates measurement of reference surface 341 when the three dimensional refined axis direction gauge is rotated by 180 degrees, because reference surface 342 is almost in the same position as reference surface 341 prior to rotation. And reference surface 352 facilitates measurement of reference surface 351 when the three dimensional refined axis direction gauge is rotated by 180 degrees, because reference surface 352 is almost in the same position as reference surface 351 prior to rotation.

In an additional alternative embodiment also represented in FIG. 3B there are additional reference surfaces 382 and 384 on the extension bar 330. It is assumed in this disclosure that the CNC milling machine table axes are straight and do not change direction. These additional reference surfaces 382 and 384 on the extension bar 330 check this assumption. In the event that the axis directions are changing direction, then this is an indication of a problem with the CNC milling machine table.

Reference surface 382 serves the same purpose as reference surface 342, except at a shorter baseline, and hence different runout position along the axis 220. The two runout positions 342 and 382 are used to measure the primary axis direction 220 and check for a change in the primary axis 220 direction in the secondary axis runout direction 240.

Similarly reference surface 384 serves the same purpose as reference surface 352, except at a shorter baseline, and hence different runout position along the primary axis 220. The two runout positions 352 and 384 are used to measure the primary axis direction 220 and check for a change in the primary axis 220 direction in the tertiary axis runout direction 260.

Shown in FIG. 3A, the face 313 of the host 310 has a boundary, measured by dimensions of points 301, 302, 303, and 304. The face 313 of the host 310 is also shown in the FIG. 3C orthographic projection 300 top view. The center of the face 313 has a point 350 at the origin of axes 220, 240, and 260 that is calculated from the dimensions of the boundary.

Shown in FIG. 3A is face 312 of the host 310 having a boundary measured by dimensions of points 302, 303, 306, and 305.

Figure 3C:
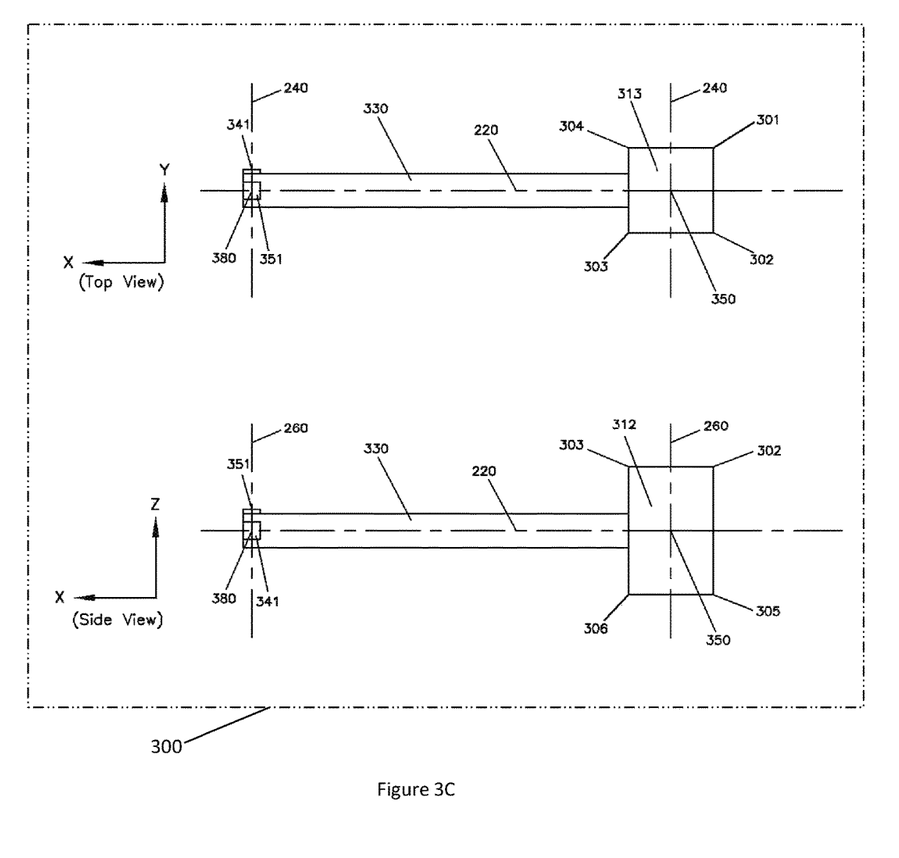
FIG. 3C shows an orthographic view of the projected top and side views of the three dimensional refined axis direction gauge.

The face 312 of the host 310 is also shown in the FIG. 3C orthographic projection 300 side view. The center of the face 312 has a point 350 at the origin of axes 220, 240, and 260 that is calculated from the dimensions of the boundary.

The three dimensional center of host 310 is determined as point 250 shown in FIG. 2. Point 250 is the origin of primary axis 220 projecting out of face 311, the secondary axis 240 projecting out of face 312, and the tertiary axis 260 projecting out of face 313.

The baseline 380 of the three dimensional axis direction gauge shown in FIG. 3A is determined from the X axis distance from the origin 250 to the center of reference surfaces 341 and 351, as measured in the X axis direction 220. Point 380 shown in the FIG. 3C orthographic 300 top and side views, is measured from point 350 in the X axis direction 220, using either axis 240 or axis 260 as a reference as shown.

Figure 4A:
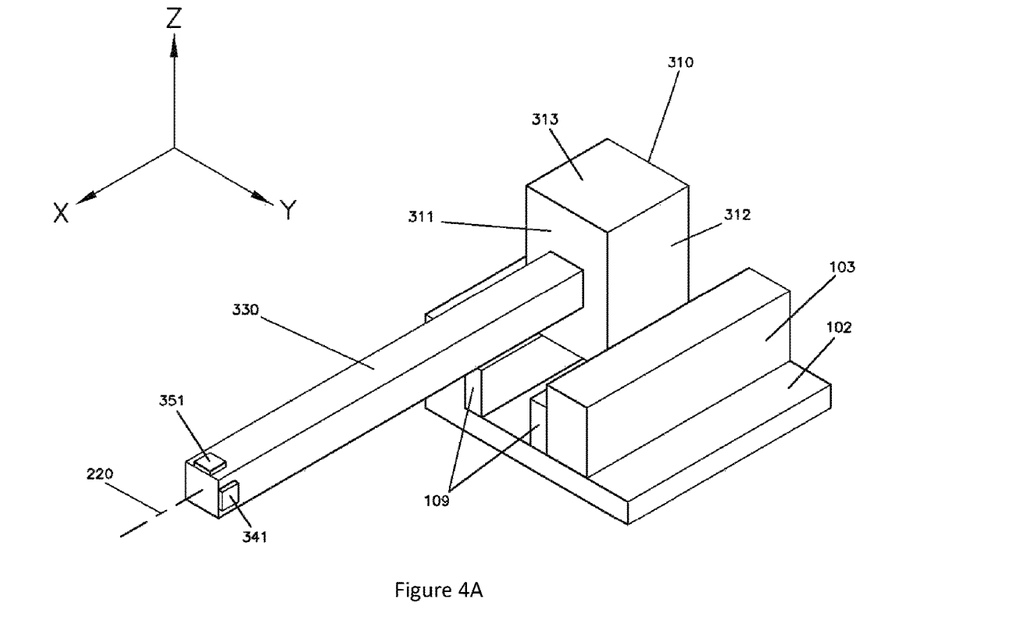
FIG. 4A shows an isometric view of the three dimensional refined axis direction gauge mounted in a vise.

Isometric FIG. 4A shows the three dimensional refined axis direction gauge placed in an initial position in the vise described in FIG. 1A and FIG. 1B, where the primary axis direction 220 determines the X axis direction of vise fixed jaw 102 in terms of table 101 motions with motion direction 104 for the X axis, with motion direction 105 for the Y axis, and with motion direction 106 for the Z axis.

The host 310 is placed on parallels 109, and placed against indexed stop 114, with clamping jaw 103 forcing host 310 against fixed jaw 102. This placing and clamping practice for host 310 is identical to the standard practice of placing work piece 100 in the vise shown in FIG. 1A and FIG. 1B.

Again it is standard practice to use a probe 112 to measure the X axis position of indexed stop 114, the Y axis position of vice fixed jaw 102, and the Z axis position of parallels 109 as described above in relation to FIG. 1A and FIG. 1B. Hence the three dimensional center of host 310 is determined as point 250 relative to the vise and in terms of table motions described by X axis direction 104 motion and Y axis 105 direction motion, and the Z axis direction 106.

The probe 112 is used to determine the initial positions of reference surface 341 and 351 in terms of the table motions shown in FIG. 4A.

Figure 4B:
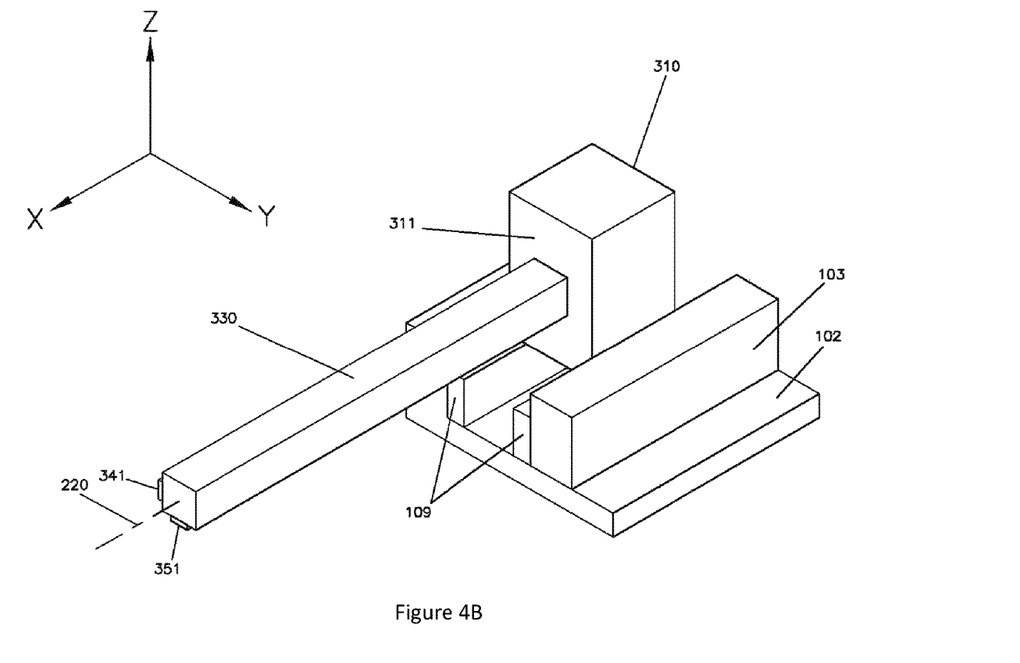
FIG. 4B shows an isometric view of the three dimensional refined axis direction gauge mounted in a vise and rotated by 180 degrees to determine an X axis.

Referring to FIG. 4B the three dimensional axis direction gauge is placed and clamped in a rotated position in the vise. The rotated position is invariant with respect to the initial position, as described below in reference to FIG. 8. The two reference surfaces 341 and 351 are measured again by probe 112.

The average position of reference surface 341 calculated from the initial and rotated Y axis table motion positions is now subtracted from the Y axis table position of origin 250. This determines the departure $\delta XinY$ in the secondary axis direction 240, with the normalized runout coefficient deltaXinY being the arctangent of the departure divided by the baseline 380.

The average position of reference surface 351 calculated from the initial and rotated Z axis table motion positions is now subtracted from the Z axis table position of origin 250. This determines the departure $\delta XinZ$ in the tertiary axis direction 260, with the normalized runout coefficient deltaXinZ being the arctangent of the departure divided by the baseline 380. Isometric FIG. 5A shows the three dimensional refined axis direction gauge placed in an initial position in the vise described in FIG. 1A and FIG. 1B, where the primary axis direction 220 determines the Y axis direction of vise fixed jaw 102 in terms of table 101 motions.

The host 310 is placed on parallels 109, and placed against indexed stop 114, with clamping jaw 103 forcing host 310 against fixed jaw 102.

Figure 5A:
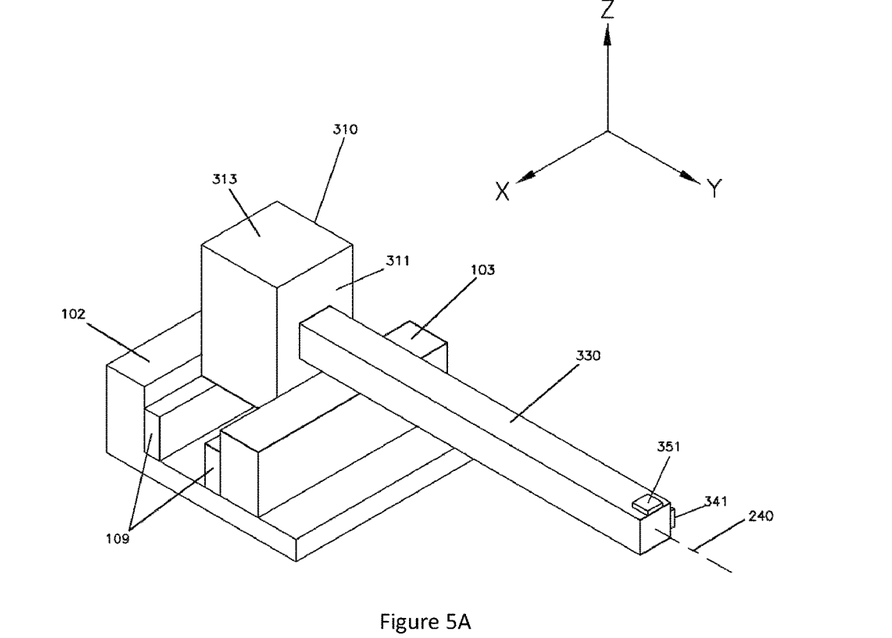
FIG. 5A shows an isometric view of the three dimensional refined axis direction gauge mounted in a vise.

The probe 112 is used to determine the initial positions of reference surface 341 and 351 in terms of the table motions shown in FIG. 5A.

Figure 5B:
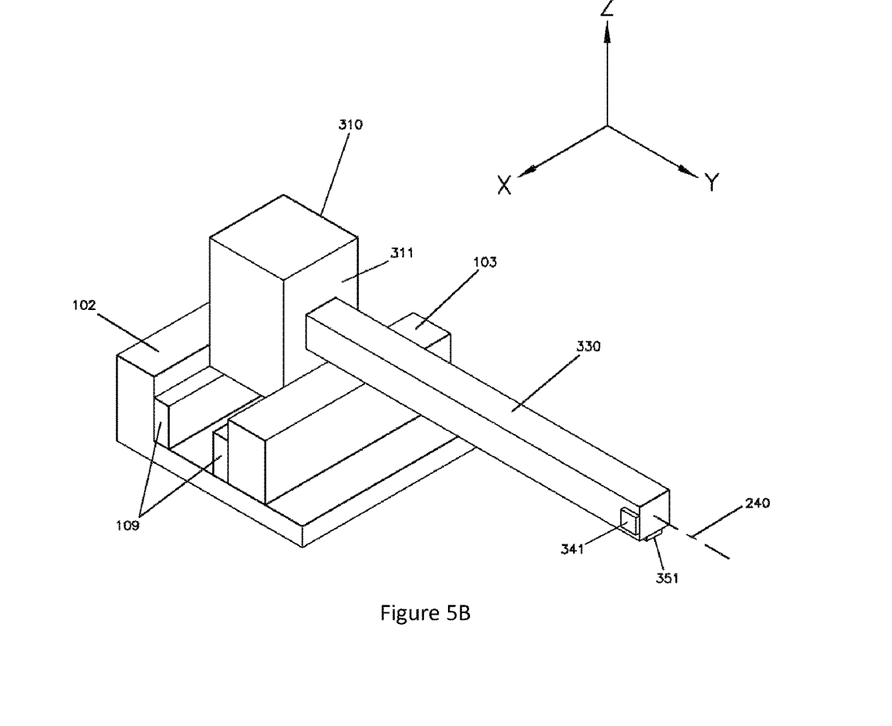
FIG. 5B shows an isometric view of the three dimensional refined axis direction gauge mounted in a vise and rotated by 180 degrees to determine a Y axis.

Referring to FIG. 5B the three dimensional axis direction gauge is placed and clamped in a rotated position in the vise. The rotated position is invariant with respect to the initial position of three dimensional axis direction gauge. The two reference surfaces 341 and 351 are measured again by probe 112.

The average position of reference surface 341 calculated from the initial and rotated X axis table motion positions is now subtracted from the X axis table position of origin 250. This determines the departure $\delta YinX$ in the secondary axis direction 240, with the normalized runout coefficient deltaYinX being the arctangent of the departure divided by the baseline 380.

The average position of reference surface 351 calculated from the initial and rotated Z axis table motion positions is now subtracted from the Z axis table position of origin 250. This determines the departure $\delta YinZ$ in the tertiary axis direction 260, with the normalized runout coefficient deltaYinZ being the arctangent of the departure divided by the baseline 380.

Figure 6A:
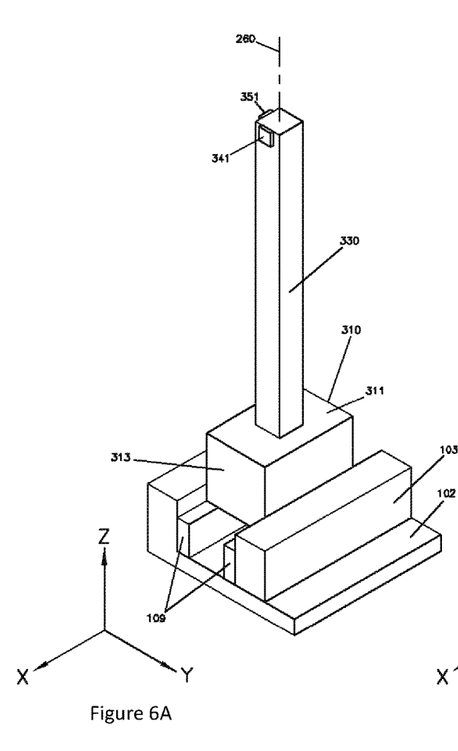
FIG. 6A shows an isometric view of the three dimensional refined axis direction gauge mounted in a vise.

Isometric FIG. 6A shows the three dimensional refined axis direction gauge placed in an initial position in the vise described in FIG. 1A and FIG. 1B, where the primary axis direction 220 determines the Z axis direction of vise fixed jaw 102 in terms of table 101 motions.

The host 310 is placed on parallels 109, and placed against indexed stop 114, with clamping jaw 103 forcing host 310 against fixed jaw 102.

The probe 112 is used to determine the initial positions of reference surface 341 and 351 in terms of the table motions shown in FIG. 6A.

Figure 6B:
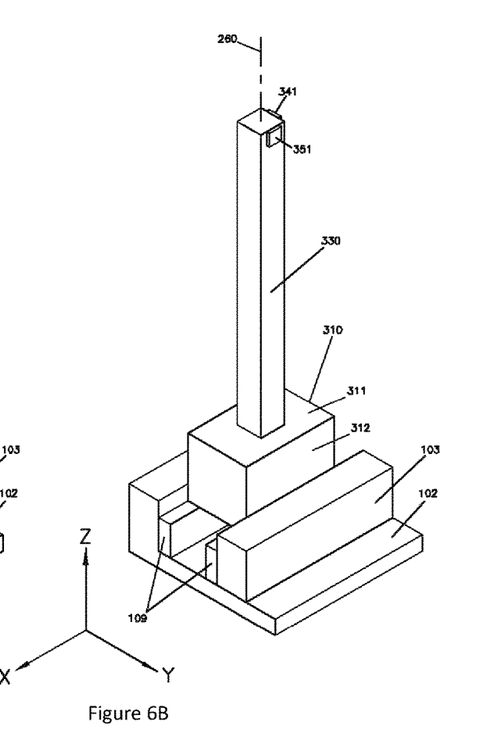
FIG. 6B shows an isometric view of the three dimensional refined axis direction gauge mounted in a vise and rotated by 180 degrees to determine a Z axis.

Referring to FIG. 6B the three dimensional axis direction gauge is placed and clamped in a rotated position in the vise. The rotated position is invariant with respect to the initial position of three dimensional axis direction gauge. The two reference surfaces 341 and 351 are measured again by probe 112.

The average position of reference surface 341 calculated from the initial and rotated X axis table motion positions is now subtracted from the X axis table position of origin 250. This determines the departure δZinX in the secondary axis direction 240, with the normalized runout coefficient deltaZinX being the arctangent of the departure divided by the baseline 380.

The average position of reference surface 351 calculated from the initial and rotated Y axis table motion positions is now subtracted from the Y axis table position of origin 250. This determines the departure δZinY in the tertiary axis direction 260, with the normalized runout coefficient deltaZinY being the arctangent of the departure divided by the baseline 380.

Figure 8A:
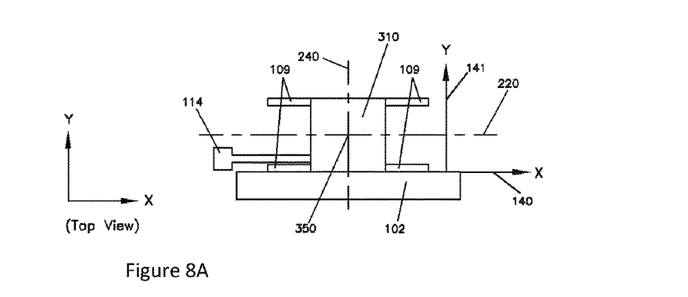
FIG. 8A shows a top view of a host mounted in a vise with X and Y axis offsets for the three dimensional refined axis direction gauge.

FIG. 8A shows a top view of host 310 sitting on parallels 109 positioned by probe engaging indexed stop 114, and clamped up against fixed vise jaw 102 by clamping vise jaw 103 not shown. Geometrical center point 350 of host 310, is at the same position as the origin 250 (not shown because it is identical to point 350) of axes 220 and 240.

Figure 8B:
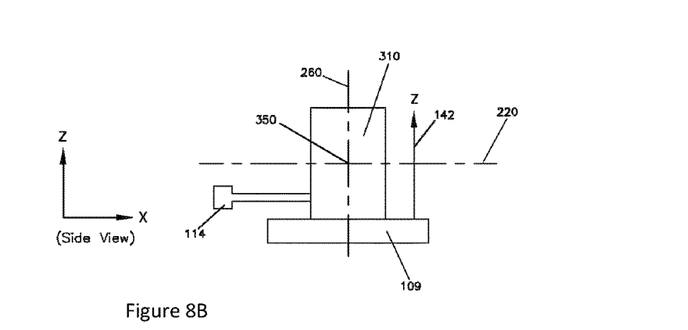
FIG. 8B shows a side view of the host mounted in a vise with Z axis offset for the three dimensional refined axis direction gauge.

FIG. 8B shows a side view of the host 310 sitting on parallels 109 and against an indexed stop 114. The host 310 is clamped up against fixed vise jaw 102 and clamping vise jaw 103 shown in FIG. 1A. Geometrical center point 350 of host 310, is at the same position as the origin 250 (not shown because it is identical to point 350) of axes 220 and 260.

Rotations by 180 degrees of host 310 about axis 220, or axis 240, or axis 260 leave the system invariant; that is point 250 and point 350 are in identical positions. The generated X' axis 220 is parallel to X axis 140, and the generated Y' axis 240 is orthogonal to X' axis 220, and generated Z' axis 260 is orthogonal to both axis 240 and axis 260.

X axis 140 may not be pointing in the same direction as X' axis 220 and the corrections are addressed above related to the normalized runout coefficients deltaXinY and deltaX in Z given in Equation (1). Y axis 141 may not be pointing in the same direction as Y' axis 240 and the corrections are addressed above related to the normalized runout coefficients deltaYinX and delta YinZ given in Equation (2). And Z axis 141 may not be pointing in the same direction as Z' axis 240 and the corrections are addressed above related to the normalized runout coefficients deltaZinX and deltaZinY given in Equation (3).

Figure 9A:
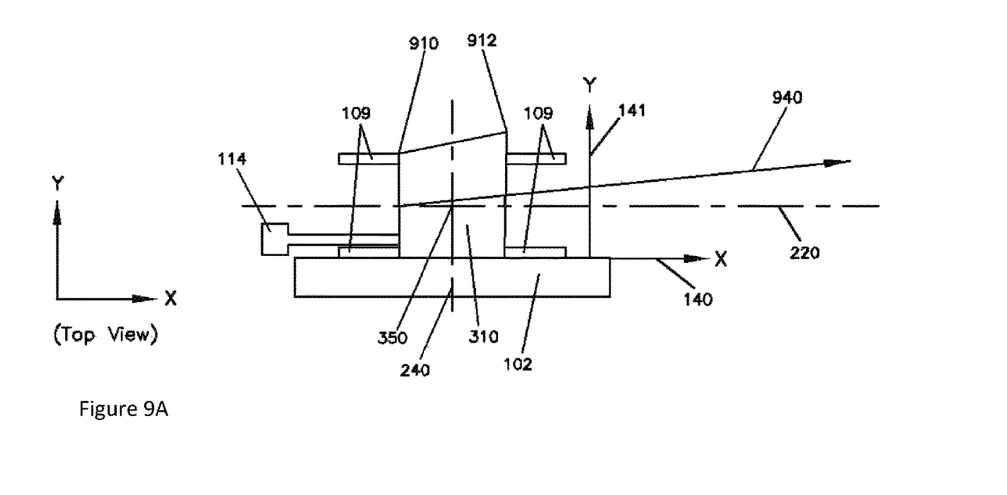
FIG. 9A shows a top view of a host with tolerance errors mounted in a vise.
Figure 9B:
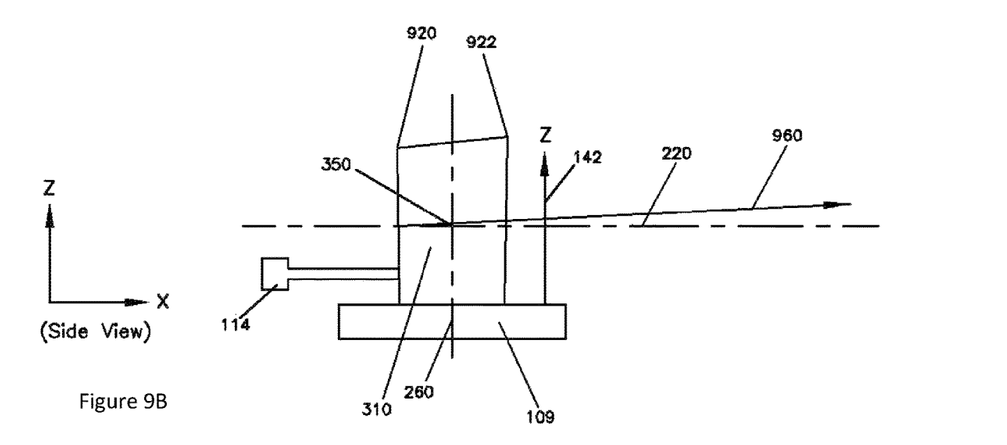
FIG. 9B shows a side view of a host with tolerance errors mounted in a vise.

Errors in fabrication of the host 310 may also lead to pointing errors as shown exaggerated in FIG. 9A top view and FIG. 9B side view. These errors will cause the actual generated X' axis 940 to have pointing errors relative to desired X' axis 220.

For example the host 310 has errors ΔXinY and ΔXinZ controlled in manufacture by tolerances which define the precision. Referring to the FIG. 9A top view, the error ΔXinY results from the difference between the Y axis measurement readings at positions 912 and 910. Similarly the FIG. 8B side view shows the error ΔXinZ which results from the difference between the Z axis measurement readings at positions 922 and 920.

Error ΔXinY will cause the generated X' axis 940 to have a runout error departure HostdeltaXinY, in the Y axis direction 240, from the desired X' axis 220. And error ΔXinZ will cause the generated X' axis 960 to have a runout error departure HostdeltaXinZ, in the Z axis direction 260, from the desired X' axis 220. The X' axis 940 and X' axis 960 departures from the X', Y', and Z' axes are shown exaggerated.

The host 310 has six measurable normalized runout coefficients:

$$HostdeltaXinY = ArcTan(\Delta XinY/(2Ba)) \text{ and}$$
$$HostdeltaXinZ = ArcTan(\Delta XinZ/(2Ba)),$$

$$HostdeltaYinX = ArcTan(\Delta YinX/(2Bb)) \text{ and}$$
$$HostdeltaYinZ = ArcTan(\Delta YinZ/(2Bb)),$$

$$HostdeltaZinX = ArcTan(\Delta ZinX/(2Bc)) \text{ and}$$
$$HostdeltaZinY = ArcTan(\Delta ZinY/(2Bc)).$$

Ba is the baseline distance between points 910 and 912 on host 310 measured in the X axis 220 direction for the host 310. And Bb is the baseline distance between points not shown on host 310 measured in the Y axis 240 direction for the host 310. Bc is the baseline distance between points not shown on host 310 measured in the Z axis 260 direction for the host 310.

We now distinguish between the measurement of the absolute position 912, and measurement of the relative position between 912 and 910 or ΔXinY. The relative position tolerance ΔXinY of host 310 can be measured more accurately than can be manufactured, where the manufacturing tolerance of ±100 pinch can be achieved for ΔXinY.

We call the measured position tolerance εXinY, where εXinY has a typical value used for final inspection of ±50 pinch and we refer to this as a standard grade. Special inspection tolerance of ±1 μinch for εXinY may be possible for the host 310 which we refer to as a premium grade equivalent to a gauge block.

A certificate of inspection, which may be traceable to NIST, lists the six measurable normalized runout coefficients, and the tolerance of the measurement inspection.

With the six host 310 corrections inspected to standard or premium grade the above Equations (1) through Equation (3) may now be corrected to give:

$$X' = Xp + (deltaXinY - HostdeltaXinY)*Y + (deltaXinZ - HostdeltaXinZ)*Z, \quad \text{Equation (4):}$$

$$Y' = Yp + (deltaYinX - HostdeltaYinX)*X + (deltaYinZ - HostdeltaXinZ)*Z, \quad \text{Equation (5):}$$

$$Z' = Zp + (deltaZinX - HostdeltaZinX)*X + (deltaZinY - HostdeltaZinY)*Y. \quad \text{and Equation (6):}$$

Hence these orthogonal axes, also corrected for host 310 errors, give the best accuracy for the points P(X', Y', Z') in terms of the digital readouts for the points along the X, Y, and Z axes.

Figure 10A:
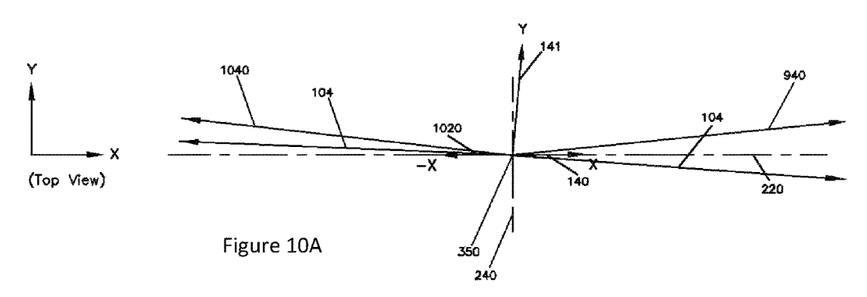
FIG. 10A shows a top view of the axes associated with the vise, the table and the host.

FIG. 10A shows a top view of the axes associated with the gauge, the vise, and the table motion directions. The vise has X axis direction 140, −X axis direction 1020, and Y axis direction 141. Relative to the vise, the table has +X axis direction 220, and −X axis direction 220. Axis 940 has a direction HostdeltaXinY relative to table motion X axis direction 220.

Axis 1040 is generated by rotating the host by 180 degrees about vise Y axis direction 141, and then rotating the host by 180 degrees about vise X axis 140.

Relative to the vise in the Y axis direction, the gauge measures the Y axis component of axis 940 as Y'positiveX, and the Y axis component of axis 1040 as Y'negativeX.

Relative to the vise in the Y axis direction 141, axis 940 is the sum of the Y axis component of the table direction 220 which is δXinY and HostdeltaXinY. So:

$$Y'positiveX = HostdeltaXinY + \delta XinY.$$

Relative to the vise in the Y axis direction 141, axis 1040 is the difference of HostdaltaXinY from the Y axis component of the table direction 220 which is δXinY. So:

$$Ya'negativeX = HostdeltaXinY - \delta XinY.$$

These can be solved to yield:

$$HostdeltaXinY = (Y'positiveX + Y'negativeX)/2, \text{ and}$$

$$\delta XinY = (Y'positiveX - Y'negativeX)/2.$$

Figure 10B:
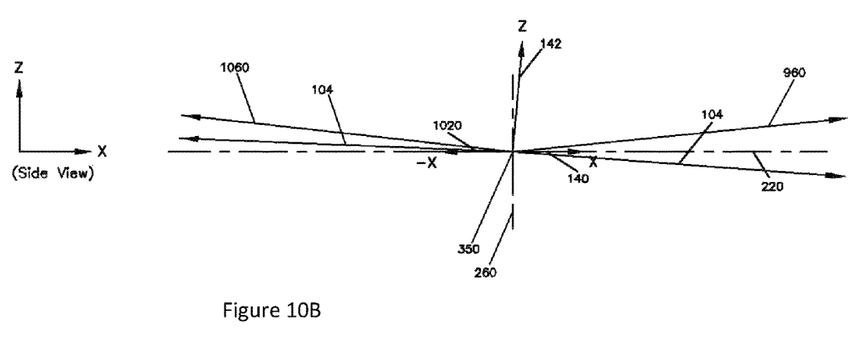
FIG. 10B shows a side view of the axes associated with the vise, the table and the host.

FIG. 10B shows a side view of the axes associated with the gauge, the vise, and the table motion directions. The vise has X axis direction 140, −X axis direction 1020, and Z axis direction 142. Relative to the vise, the table has +X axis direction 220, and −X axis direction 220. Axis 960 has a direction HostdeltaXinZ relative to table motion X axis direction 220.

Axis 1060 is generated by rotating the host by 180 degrees about vise Z axis direction 142, and then rotating the host by 180 degrees about vise X axis 140.

Relative to the vise in the Z axis direction 142, the gauge measures the Z axis component of axis 960 as Z'positiveX, and the Y axis component of axis 1060 as Z'negativeX.

Relative to the vise in the Z axis direction 142, axis 960 is the sum of the Z axis component of the table direction 220 which is δXinZ and HostdeltaXinZ. So:

$$Z'positiveX = HostdeltaXinZ + \delta XinZ.$$

Relative to the vise in the Z axis direction 142, axis 1060 is the difference of HostdaltaXinZ from the Z axis component of the table direction 220 which is δXinZ. So:

$$Z'negativeX = HostdeltaXinY - \delta XinZ.$$

These can be solved to yield:

$$HostdeltaXinZ = (Z'positiveX + Z'negativeX)/2, \text{ and}$$

$$\delta XinZ = (Z'positiveX - Z'negativeX)/2.$$

The same method can be used in the Y' axis direction 141 to yield:

$$HostdeltaYinX = (X'positiveY + X'negativeY)/2, \text{ and}$$

$$\delta YinX = (X'positiveY - X'negativeY)/2.$$

And:

$$HostdeltaYinZ = (Z'positiveY + Z'negativeY)/2, \text{ and}$$

$$\delta YinZ = (Z'positiveY - Z'negativeY)/2.$$

This method fails in the Z axis direction because the negative Z axis would go down into the vise and the table. Hence it is required to measure HostdeltaZinX and HostdeltaZinY.

Figure 11:
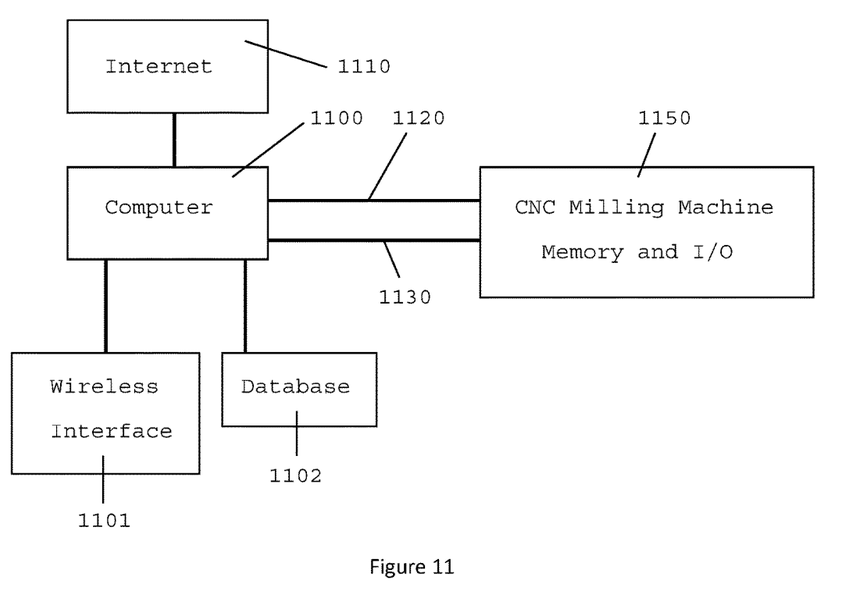
FIG. 11 shows a remote computer control of a machine tool table with an internet and wireless interface.

The computer 1100 with database 1102 for controlling the CNC milling machine 1150 using RS-232 cable interface 1120, and digital interface lines 1130 is shown in FIG. 11. The computer 1100 may be connected to the internet 1110, and have a wireless interface communicating to a device (not shown) on the CNC mill 1150 table. The wireless interface and device on the CNC mill 1150 table, are used to collect environmental values as described in the parent patent.

Software executable computer assistance for an operator, in the computer assisted setup of a machine tool table, may determine axes with a non-transitory computer readable storage medium with instructions executed by a processor in computer 1100. For example, an operator using a graphical user interface associated with computer 1000 may supply an input. An output may then be communicated to the operator using the graphical user interface. The operator may supply at the graphical user interface a host assembly serial number and operator personal identification number. The Internet 1110 may be accessed to connect to a web site. Host assembly dimensions may be received from the web site. The computer 1100 may then calculate host assembly offsets and coefficients from host dimensions. The computer 1100 may then direct the operator to insert the host assembly into a vise on the machine tool table with the first primary-axis direction of the host pointing in the X-axis direction of the vise. The work fixture offsets of the vise are the vise fixed jaw in the vise Y-axis direction, the parallels in the vise Z-axis direction, and the stop in the vise X-axis direction.

The position of the host in the vise is measured. That is, work offset distances are measured using a probe mounted in the spindle. The dimensional center position of the host is calculated in offset distances using the three table motion directions. The automatic measurement of the axis extension secondary reference surface position of the host assembly in the vise, is measured in terms of work offset distances using a probe mounted in the spindle to set the axis extension secondary reference surface position in memory locations of the CNC machine. The table has table X-axis motion direction and table Y-axis motion direction and table Z-axis motion direction.

The initial position of the axis extension secondary reference surface is calculated in terms of work offset distances and host assembly offsets measured using the three table motion directions. The automatic measurement of the axis extension tertiary reference surface position of the host assembly in the vise is accomplished using a probe mounted in the spindle to set the axis extension tertiary reference surface position in memory locations of the CNC machine. The initial position of the axis extension secondary reference surface is calculated in terms of work offset distances and host assembly offsets measured using the three table motion directions. The computer 1100 may direct the operator to insert the host assembly into a vise on the machine tool table with the first primary-axis direction of the host pointing in the X-axis direction of the vise, where the host assembly is rotated 180 degrees about the first primary-axis direction. The automatic measurement of the axis extension secondary reference surface position of the host assembly in the vise is accomplished using a probe mounted in the spindle to set the axis extension secondary reference surface position in memory locations of the CNC machine. The rotated-position of the axis extension secondary reference surface is calculated in terms of work offset distances and host assembly offsets measured using the three table motion directions.

The automatic measurement of the axis extension tertiary reference surface position of the host assembly in the vise is controlled in terms of work offset distances using a probe mounted in the spindle to set the axis extension tertiary reference surface position in memory locations of the CNC machine. The rotated-position of the axis extension tertiary reference surface is calculated in terms of work offset distances and host assembly offsets measured using the three table motion directions.

The average of the initial position and rotated-position of the axis extension tertiary reference surface is calculated in terms of work offset distances using the three table motion directions. The departure of the tertiary reference surface position is calculated in terms of work offset distances by subtracting the average tertiary reference surface positions from the dimensional center position of the host.

The average between the initial and rotated axis extension tertiary reference surface position is calculated in terms of work offset distances using the three table motion directions. The departure of the tertiary reference surface position in terms of work offset distances is calculated by subtracting the average tertiary reference surface position from the dimensional center position of the host. The foregoing operations are repeated for additional axes.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
receive a first host border measurement signal for a host;
receive a second host border measurement signal for the host;
receive first x-axis axial measurement signals from border measurements of an extension bar extending from the host in a first x-axis orientation;
receive second x-axis axial measurement signals from border measurements of the extension bar extending from the host in a second x-axis orientation 180 degrees rotated from the first x-axis orientation;
receive first y-axis axial measurement signals from border measurements of the extension bar extending from the host in a first y-axis orientation;
receive second y-axis axial measurement signals from border measurements of the extension bar extending from the host in a second y-axis orientation 180 degrees rotated from the first y-axis orientation;
receive first z-axis axial measurement signals from border measurements of the extension bar extending from the host in a first z-axis orientation;
receive second z-axis axial measurement signals from border measurements of the extension bar extending from the host in a second z-axis orientation 180 degrees rotated from the first z-axis orientation;
compute an x-axis axial position based upon the first host border measurement signal, the second host border measurement signal, the first x-axis axial measurement signals and the second x-axis axial measurement signals;
compute a y-axis axial position based upon the first host border measurement signal, the second host border measurement signal, the first y-axis axial measurement signals and the second y-axis axial measurement signals;
compute a z-axis axial position based upon the first host border measurement signal, the second host border measurement signal, the first z-axis axial measurement signals and the second z-axis axial measurement signals;
coordinate the operation of a computer numerical control milling machine based upon the x-axis axial position, the y-axis axial position and the z-axis axial position.

2. The non-transitory computer readable storage medium of claim 1 with instructions executed by the processor to prompt an operator for a part serial number.

3. The non-transitory computer readable storage medium of claim 1 with instructions executed by the processor to contact a networked machine to obtain host assembly dimensions corresponding to the part serial number.

4. The non-transitory computer readable storage medium of claim 1 with instructions executed by the processor to prompt an operator to obtain the first host border measurement signal, the second host border measurement signal, the first x-axis axial measurement signals, the second x-axis axial measurement signals, the first y-axis axial measurement signals, the second y-axis axial measurement signals, the first z-axis axial measurement signals and the second z-axis axial measurement signals.

5. The non-transitory computer readable storage medium of claim 1 with instructions executed by the processor to receive third x-axis axial additional measurement signals from measurements of the extension bar extending from the host in the first x-axis orientation, wherein the additional measurement signals are collected from approximately the middle of the extension bar.

6. The non-transitory computer readable storage medium of claim 5 with instructions executed by the processor to receive fourth x-axis axial supplemental measurement signals from measurements of the extension bar extending from the host in the second x-axis orientation 180 degrees rotated from the first x-axis orientation, wherein the supplemental measurement signals are collected from approximately the middle of the extension bar.

* * * * *